United States Patent
Hsiao

(10) Patent No.: US 6,655,007 B2
(45) Date of Patent: Dec. 2, 2003

(54) METHOD OF MAKING A READ SENSOR FOR A MERGED MAGNETIC HEAD WITH SELF-ALIGNED LOW RESISTANCE LEADS

(75) Inventor: Richard Hsiao, San Jose, CA (US)

(73) Assignee: Hitachi Global Storage Technologies Netherlands B. V., Amsterdam (NL)

( * ) Notice: Subject to any disclaimer, the term of this patent is extended or adjusted under 35 U.S.C. 154(b) by 301 days.

(21) Appl. No.: 09/761,002

(22) Filed: Jan. 16, 2001

(65) Prior Publication Data

US 2001/0004797 A1 Jun. 28, 2001

Related U.S. Application Data

(62) Division of application No. 09/139,044, filed on Aug. 24, 1998, now Pat. No. 6,209,193.

(51) Int. Cl.[7] .......................... G11B 5/127; G11B 5/187; B44C 1/22
(52) U.S. Cl. ............................... 29/603.12; 29/603.07; 29/603.13; 29/603.18; 216/22; 216/66; 216/67; 204/192.34
(58) Field of Search .................. 29/603.07, 603.11, 29/603.12, 603.13, 603.18; 216/22, 49, 66, 67, 72, 75, 78; 360/317–320, 322, 324, 326; 204/192.34

(56) References Cited

U.S. PATENT DOCUMENTS

| | | | | |
|---|---|---|---|---|
| 4,803,580 A | * | 2/1989 | Mowry | 360/317 |
| 5,212,609 A | * | 5/1993 | Yuito et al. | 216/49 |
| 5,463,517 A | * | 10/1995 | Toda et al. | 360/322 |
| 5,491,600 A | * | 2/1996 | Chen et al. | 360/322 |
| 5,568,335 A | * | 10/1996 | Fontana et al. | 360/320 |
| 5,916,423 A | * | 6/1999 | Westwood | 29/603.15 |
| 5,976,769 A | * | 11/1999 | Chapman | 216/72 |

FOREIGN PATENT DOCUMENTS

JP   8-221722   * 9/1996

* cited by examiner

Primary Examiner—A. Dexter Tugbang
(74) Attorney, Agent, or Firm—Ervin F. Johnston

(57) ABSTRACT

A method of making read sensor with self-aligned low resistance leads is provided. In the method a masking step has been eliminated by employing first, second and third protective capping layers in the construction of the read sensor and first and second lead layers. The first capping layer serves as a protective layer for the read sensor sites, the second capping layer protects low resistance lead layer portions during removal of the first capping layer from high resistance lead layer sites and then serves as a sacrificial layer during removal of spin valve material from the low resistance lead layer sites. The third capping layer protects the first and second lead layers during milling of low resistance lead layer material in field regions about the read sensor and first and second lead layers. The method aligns front edges of the low resistance lead layer portions with a rear edge of the read sensor so as to lower the overall resistance of the lead layers.

8 Claims, 16 Drawing Sheets

METHOD OF MAKING A READ SENSOR FOR A MERGED MAGNETIC HEAD WITH SELF-ALIGNED LOW RESISTANCE LEADS

REFERENCE TO RELATED APPLICATION

This is a divisional application of application Ser. No. 09/139,044 filed Aug. 24, 1998 now U.S. Pat. No. 6,209,193.

BACKGROUND OF THE INVENTION

1. Field of the Invention

The present invention relates to a read sensor with self-aligned low resistance leads and a method of making wherein the method employs protective capping layers during milling steps for eliminating a masking step in the construction of low resistance lead layer portions of the lead structure.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating. When the disk rotates air is swirled by the rotating disk adjacent the ABS to cause the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

The read head includes a read sensor that is located between first and second gap layers and the first and second gap layers are located between first and second shield layers. The first and second gap layers magnetically insulate the read sensor from the shield layers and the shield layers protect the read sensor from stray magnetic fields. Accordingly, the read sensor is sensitive to flux signals from the rotating disk within the distance between the first and second shield layers. This distance defines the linear density capability of the read head. The smaller this distance the greater the linear density and the more information that can be read by the read head per track length.

The flux signals imposed on the read head change the resistance of the read sensor. By conducting a sense current through the read sensor the processing circuitry can detect a change in potential when the flux signal changes the resistance of the read sensor. In a digital scheme where ones and zeros convey information the flux signal can represent a one and the absence of a flux signal can represent a zero. Accordingly, incremental lengths of the track represent bits of information in the digital scheme. The greater the linear density, the greater the number of bits of information that can be read by the read head from the track on the rotating disk.

The read sensor can be an anisotropic magnetoresistive (AMR) sensor or a spin valve (SV) sensor. Either of these sensors is sensitive to flux incursions so that when the sense current is conducted through the sensor potential changes can be detected by the processing circuitry. The sense current is conducted through the read sensor by first and second leads that are connected at opposite ends of the read sensor. The first and second leads are located between the first and second gap layers which electrically insulate the leads from the shield layers. A portion of each of the leads is exposed at the aforementioned ABS where they are subjected to corrosion. An anticorrosion and mechanically stable material is selected for these lead portions, such as tantalum (Ta). Unfortunately, Ta is also highly resistive. These lead portions are referred to as the high resistance lead portions. At a recessed location in the head a low resistance lead portion is stitched (overlapping connection) to a respective high resistance portion. The stitching approach also reduces the topography of the lead structure at the ABS. The lead topology, normally replicated into the second shield (first pole piece), can degrade the performance of the write head because of write gap curvature. In the past the high resistance portions extend along the ABS after which they make a bend inwardly for connection to the low resistance portions. This bend has been necessary because of the alignment tolerances in the photomasking process. It would be desirable if the lengths of the high resistance portions could be reduced so as to reduce resistance of the lead structure and heat generated thereby.

The aforementioned lead structure is typically made with three photopatterning (masking) steps. Each photopatterning step involves spinning a layer of photoresist on a wafer where multiple heads are being constructed, light imaging the photoresist layer to prepare portions of the photoresist layer that are to be removed and then removing the photoresist portions with a developer. Milling, such as ion milling or etching is then employed to remove layer portions exposed by the open portions of the photoresist layer.

After applying a layer of read sensor material to the wafer a first mask may be employed for making the high resistance lead portions and defining the track width of the read sensor. Read sensor material exposed by the openings are milled away and high resistance material is deposited to form the high resistance lead portions. By this method side edges of a partially completed read sensor and the high resistance leads abut one another making them self-aligned with respect to one another. A second mask covers the high resistance lead portions and a read sensor site. Milling is then employed to remove a remainder of the read sensor material leaving only the read sensor and the high resistance lead portions connected thereto. A third mask then covers the read sensor and portions of the high resistance lead portions leaving each high resistance lead portion with a stitch region. Low resistance material is then deposited which forms low resistance lead portions that are stitched to the high resistance lead portions and which extend to terminals. It would be desirable if one of the masking steps could be eliminated without degrading the lead structure.

SUMMARY OF THE INVENTION

The present invention employs only two masking steps in the construction of the lead structure of the read head. The third masking step, which is employed for constructing the low resistance lead portions, is eliminated by the present invention. This is accomplished by employing protective capping layers that are deposited at various stages of the construction so that milling without a photoresist mask can be employed for constructing the low resistance lead portions. The capping layers are different materials and the dry etching is of different types so that preferential etching can be performed. Preferential etching means that during a selected etching step one or more of the capping layers is etched significantly slower than the other layers. The capping layers are preferably selected from the group C, $Al_2O_3$ and $SiO_2$ and the etching is based from the group $O_2$, Ar, fluorocarbon and chlorine containing gases. As an example, an $O_2$ based reactive etching will remove the C cap and leave a Ta cap essentially intact, an Ar based milling will remove the Ta cap and unwanted read sensor material, a fluorocarbon based etching will remove the Ta cap without essentially etching the C and $Al_2O_3$ caps and the Ar based milling will remove the unwanted copper or gold without significantly etching the C and $Al_2O_3$ caps. By appropriately locating these capping layers and selecting appropriately based etching a lead structure with low overall resistance can be produced with less photomasking steps.

The present method lends itself to constructing a lead structure that has a lower resistance than prior art lead structures. Each of the low resistance lead portions has a front edge that is coextensive with a back edge of the read sensor. Each of first and second high resistance lead portions has a side edge that is contiguous with a side edge of the read sensor (self-aligned) and has a recessed portion that overlaps a respective low resistance portion. Accordingly, the lengths of the high resistance portions is minimized. The widths of the high resistance portions at the ABS is greatly reduced. Instead of making a bend each high resistance portion extends straight back into the head and overlaps a respective low resistance lead portion. With this arrangement resistance is reduced and corrosion of the lead structure at the ABS is reduced.

An object of the present invention is to provide an improved method of making a lead structure of a read head.

Another object is to make a read sensor and first and second leads connected to the read sensor with only two masking steps.

A further object is to selectively employ various capping layers and chemically based dry etching for eliminating a masking step in the construction of a lead structure of a read head.

Still another object is to provide a method of making a read head that enables a reduction in the resistance of a lead structure and reduced corrosion of the lead structure at an air bearing surface.

Still a further object is to provide a lead structure that has a reduced resistance.

Other objects and advantages of the present invention will be appreciated upon reading the following description taken together with the accompanying drawings.

DESCRIPTION OF THE PREFERRED EMBODIMENTS

Magnetic Disk Drive

Figure 1:
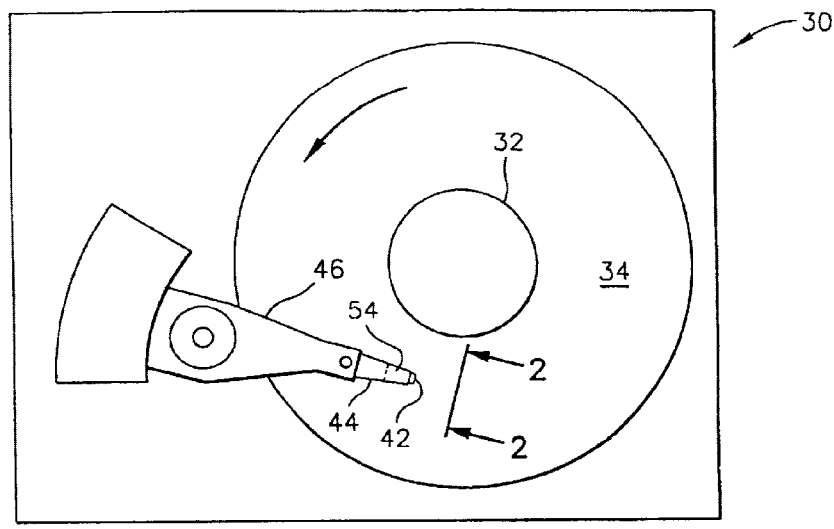
FIG. 1 is a plan view of an exemplary magnetic disk drive.
Figure 2:
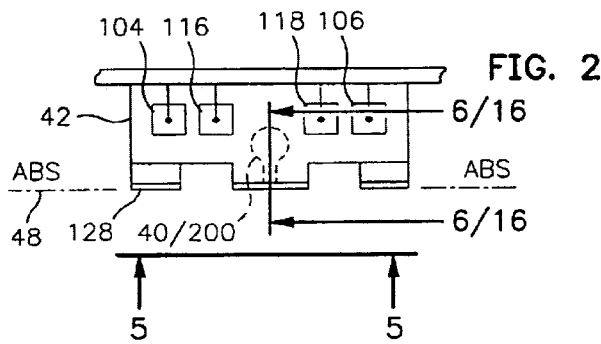
FIG. 2 is an end view of a slider with a magnetic head of the disk drive as seen in plane 2—2.
Figure 3:
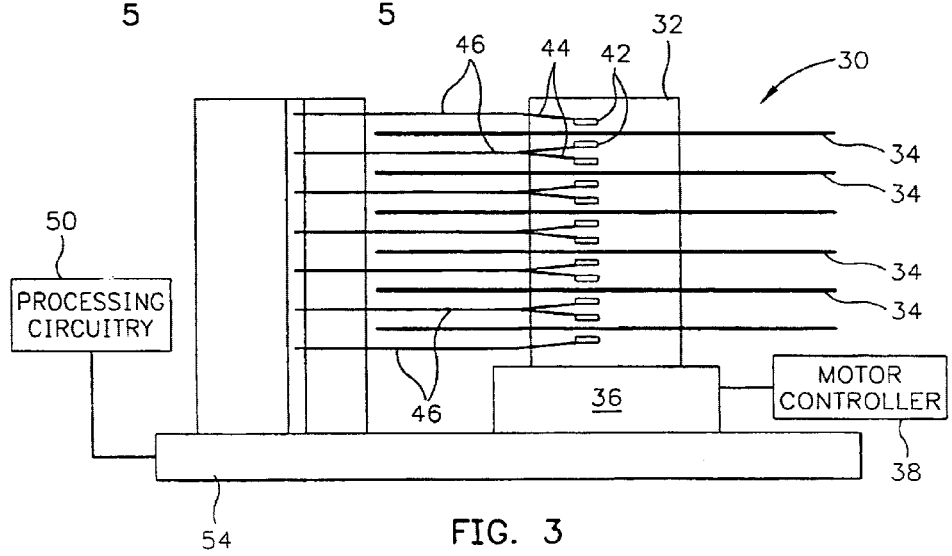
FIG. 3 is an elevation view of the magnetic disk drive wherein multiple disks and magnetic heads are employed.
Figure 4:
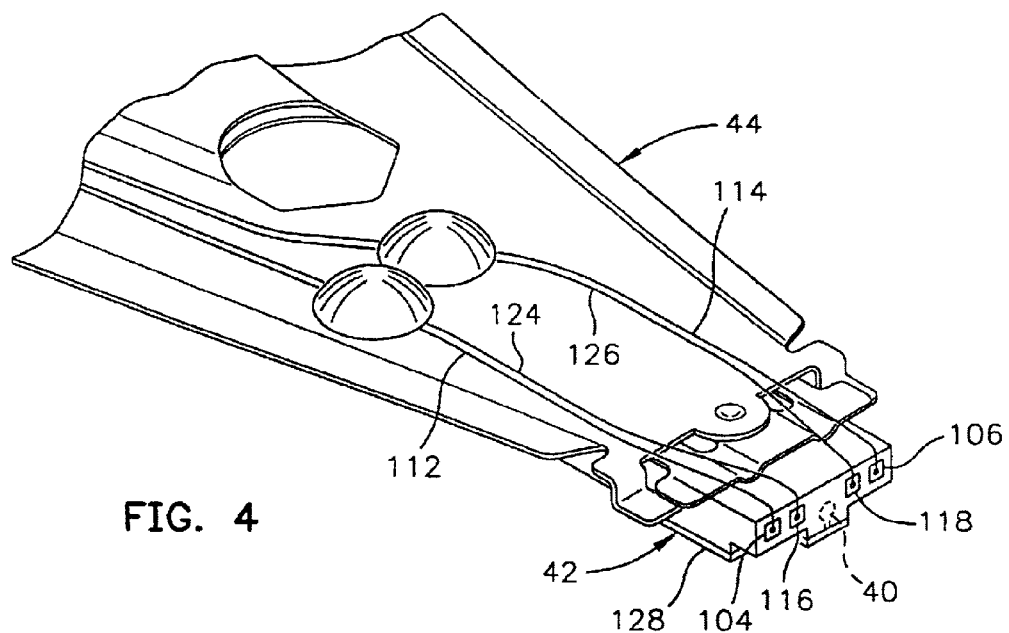
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36, the slider is supported on a thin (typically, 0.05 $\mu$m) cushion of air (air bearing) between the surface of the disk 34 and an air bearing surface (ABS) 48. The magnetic head 40 may then be employed for writing information to multiple circular tracks on the surface of the disk 34, as well as for reading information therefrom. Processing circuitry 50 exchanges signals representing such information with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54, as shown in FIG. 3.

Figure 5:
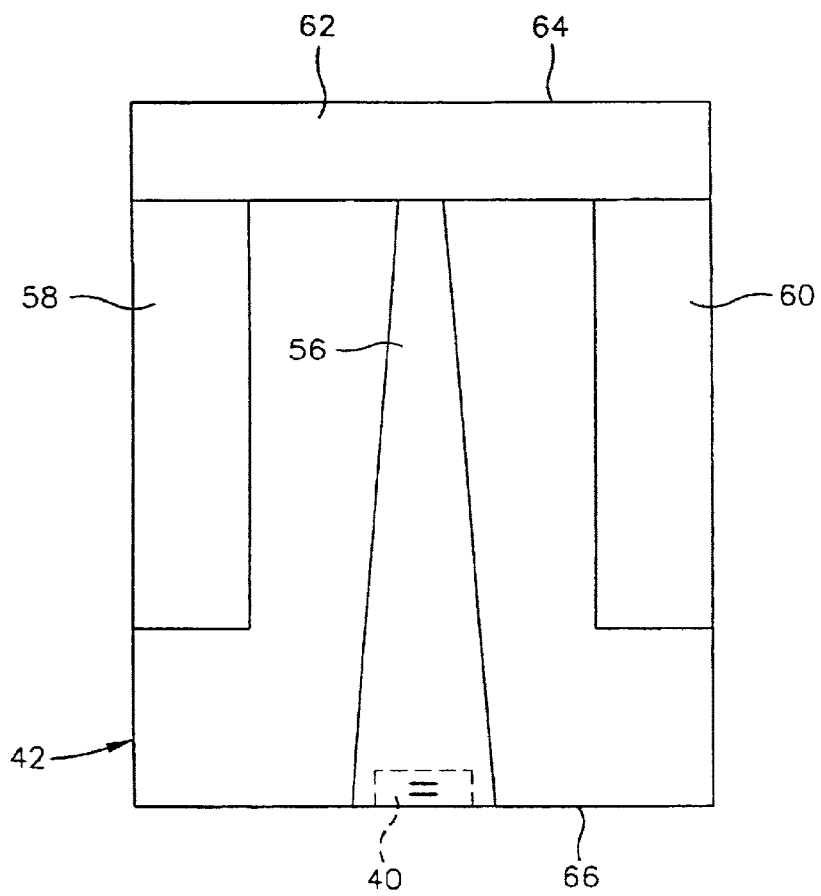
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
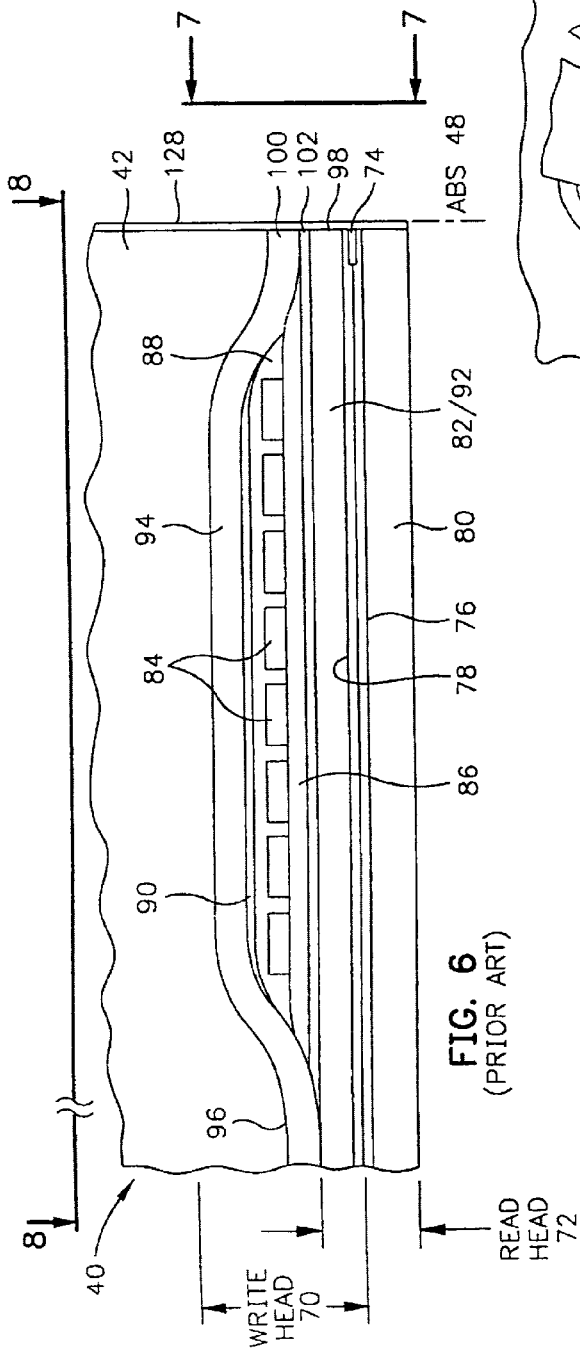
FIG. 6 is a partial view of the slider and magnetic head as seen in plane 6—6 of FIG. 2.

FIG. 6 is a side cross-sectional elevation view of the merged MR head 40, which has a write head portion 70 and a read head portion 72, the read head portion employing a spin valve sensor 74 of the present invention. Optionally, the sensor may be an AMR sensor.

Figure 7:
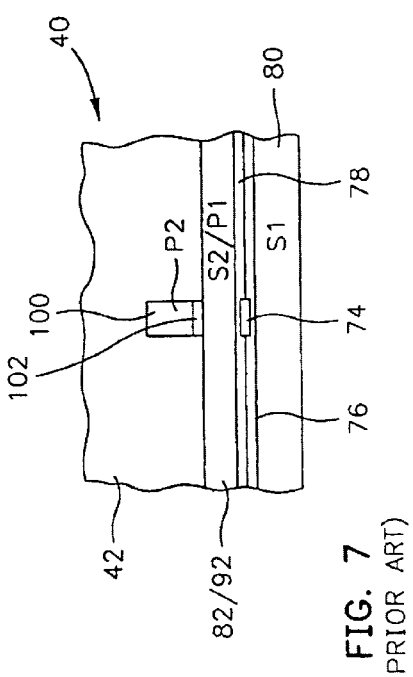
FIG. 7 is a partial ABS view of the slider taken along plane 7—7 of FIG. 6 to show the read and write elements of the magnetic head.

FIG. 7 is an ABS view of FIG. 6. The spin valve sensor 74 is sandwiched between first and second gap layers 76 and 78 and the gap layers are sandwiched between first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

Figure 8:
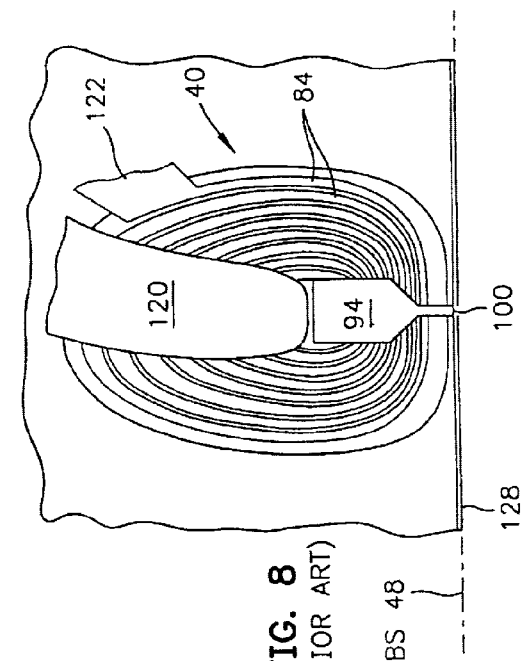
FIG. 8 is a view taken along plane 8—8 of FIG. 6 with all material above the second pole piece removed.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7.

Figure 9:
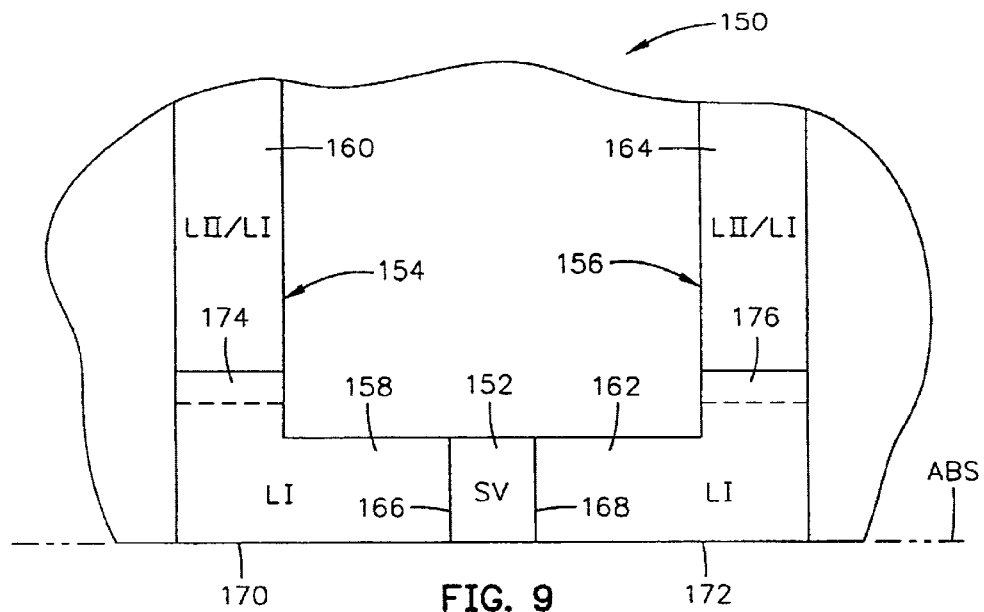
FIG. 9 is a plan view of a read sensor (SV) and a first and second leads of a prior art structure.

FIG. 9 illustrates a portion of a wafer 150 where a read sensor (SV) 152 and first and second leads 154 and 156 have been constructed. The first lead 154 includes a high resistance lead layer (LI) 158 and a low resistance lead layer (LII) 160. The second lead 156 includes a high resistance lead layer (LI) 162 and a low resistance lead layer (LII) 164. The high resistance lead layers 158 and 162 make contiguous junctions with the read sensor 152 at edges 166 and 168 and, after lapping, have exposed surfaces 170 and 172 at an air bearing surface (ABS). The high resistance lead layers 158 and 162 are preferably (Ta) which is corrosion resistant. Unfortunately, (Ta) has a high resistance. The high resistance leads 158 and 162 extend along the ABS and make a bend into the head where they are overlapped by the low resistance lead layers 160 and 164 at stitch regions 174 and 176 for making electrical connection therebetween. Because of these lengths significant resistance is added to the read head circuit which degrades the signal to noise ratio and unduly heats the head. It should be noted that if a high resistance lead is made thicker to reduce its resistance that this will increase the topology in the leads and the first pole piece as mentioned previously.

Figure 10:
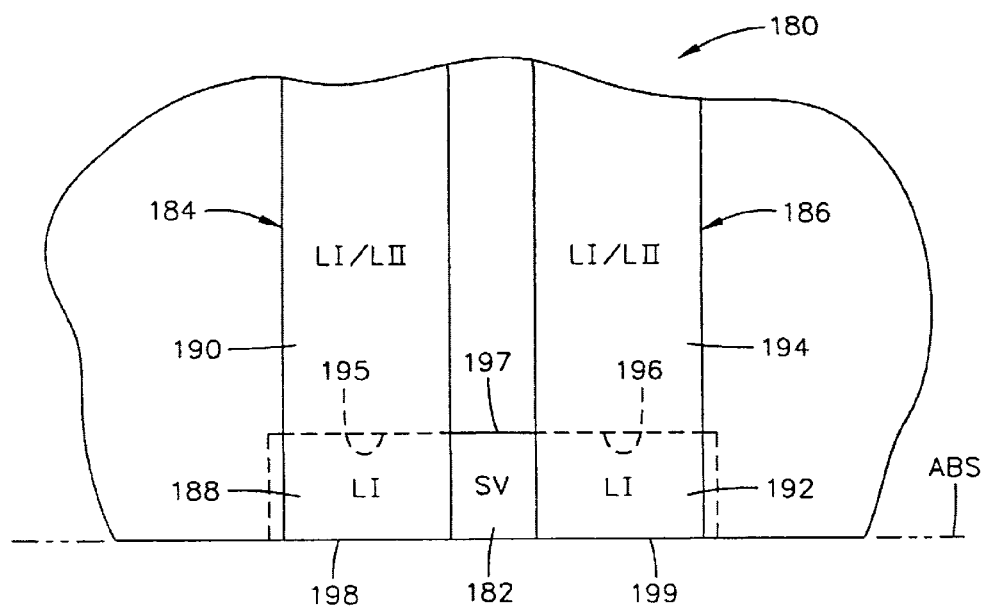
FIG. 10 is a plan view of a read sensor (SV) and first and second leads of the present structure.

FIG. 10 illustrates a wafer portion 180 of the present invention where a read sensor 182 and first and second leads 184 and 186 have been constructed. The first lead 184 includes a high resistance lead layer (LI) 188 and a low resistance lead layer (LII) 190 and the second lead layer 186 includes a high resistance lead layer (LI) 192 and a low resistance lead layer (LII) 194. The high resistance lead layers 188 and 192 do not make a bend into the head. Accordingly, there is less resistance in the read head circuit. The low resistance lead layers 190 and 194 have forward edges 195 and 196 that are coextensive with a back edge 197 which defines a stripe height of the read sensor 182. The high resistance lead layer portions 188 and 192 extend straight back from the ABS without a bond and overlap the low resistance lead layer portions 190 and 194. The exposed edges 198 and 199 of the high resistance lead layers is less than that in the prior art.

Exemplary Method of Making

FIGS. 11–26 illustrate an exemplary method of making the lead structure shown in FIG. 9 and FIGS. 27–40 illustrate the present method of making the lead structure shown in FIG. 10. In both methods, ion beam deposition or sputter deposition is employed for depositing the metal and insulation layers. The masks are preferably bilayer photoresist layers wherein a bottom photoresist layer is recessed from a top photoresist layer so that a dissolvent can dissolve the bottom layer, thereby permitting the mask to be lifted from the wafer carrying with it the sputtered material deposited thereon. Stippled layers are insulation layers in FIGS. 11–26 and heavy lines show the outlines of the masks. Also, the masks are defined by light cross-hatching. L(I) represents a high resistance lead layer film for the first lead layer and L(II) represents a low resistance lead layer film for the first lead layer. While the lead layers L(I) and L(II) are described primarily in reference to a first lead, these layers apply equally as well to a second lead. S1 and S2 designate first and second shield layers and G1 and G2 designate first and second read gap layers.

Figure 11:
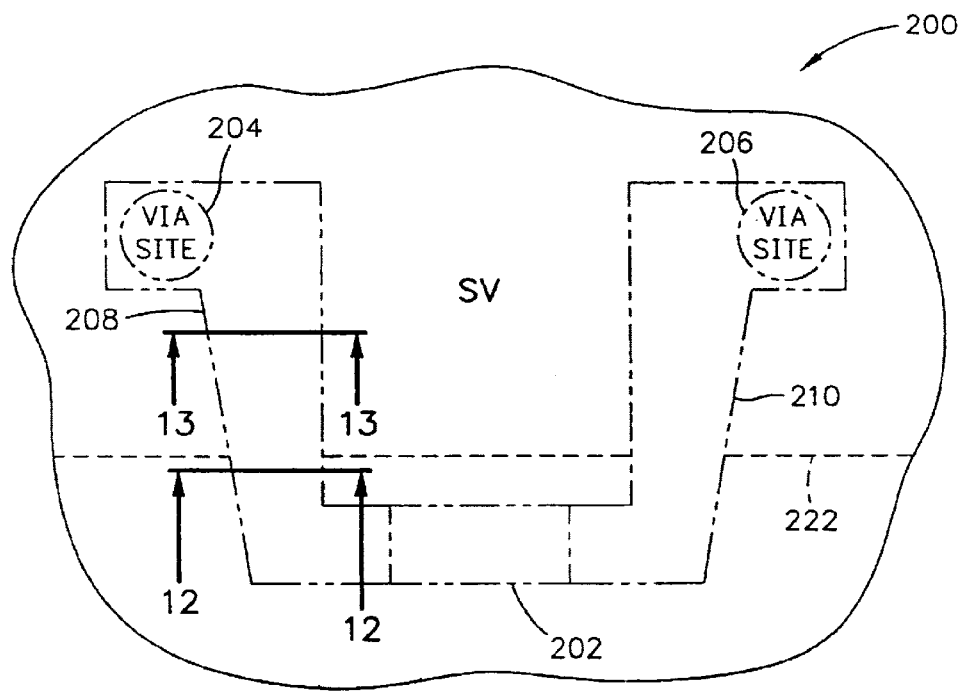
FIG. 11 is a plan view of a first insulative gap layer deposition step of a previous method.
Figures 12, 13:
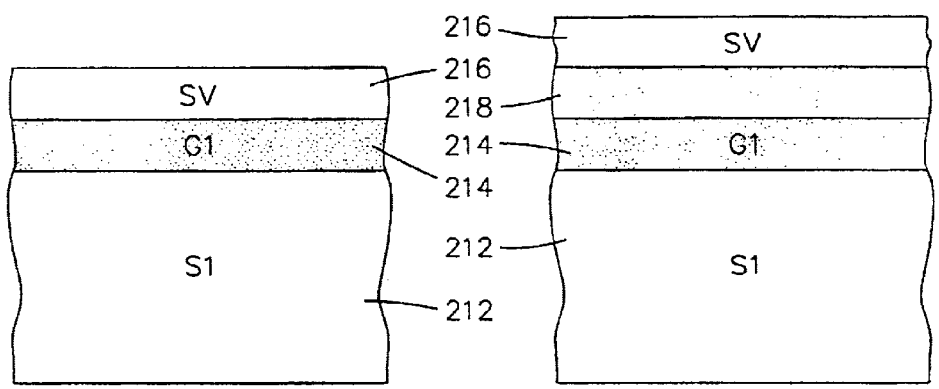
FIG. 12 is a view taken along plane 12—12 of FIG. 11.
FIG. 13 is a cross-sectional view taken along plane 13—13 of FIG. 11.

FIG. 11 is a plan view of a portion 200 of a wafer where a magnetic spin valve (SV) read head is to be constructed along with other SV read heads (not shown) arranged in rows and columns (not shown) on the wafer. The wafer portion 200 shows an SV site 202, first and second via sites 204 and 206, and first and second lead layer sites 208 and 210 which electrically connect side edges of the SV sensor to the via sites. Each via site 204 and 206 is a vertically disposed (out of paper) electrical conductor connecting a lead to a respective terminal (see 104 and 106 in FIG. 2). As shown in FIG. 12, a first shield layer 212, a first gap layer 214 and an SV material layer 216 have been formed while as shown in FIG. 13, the first shield layer 212, the first insulative gap layer 214, a first insulation layer 218 and the SV material layer 216 have been formed. In this process, a first mask (not shown) was employed for constructing the first insulation layer 218 on top of the first gap layer 214 behind the SV sensor site along line 222. The purpose of the first insulation layer 218 is to provide extra insulation for the first and second lead layers that are to be constructed at the lead layer sites 208 and 210. The extra insulation prevents shorting of the leads through pinholes in the first gap layer 214 to the first shield layer 212. It should be noted that a front portion of each lead layer site below line 222 is left unprotected by the first insulation layer 218.

Figure 14:
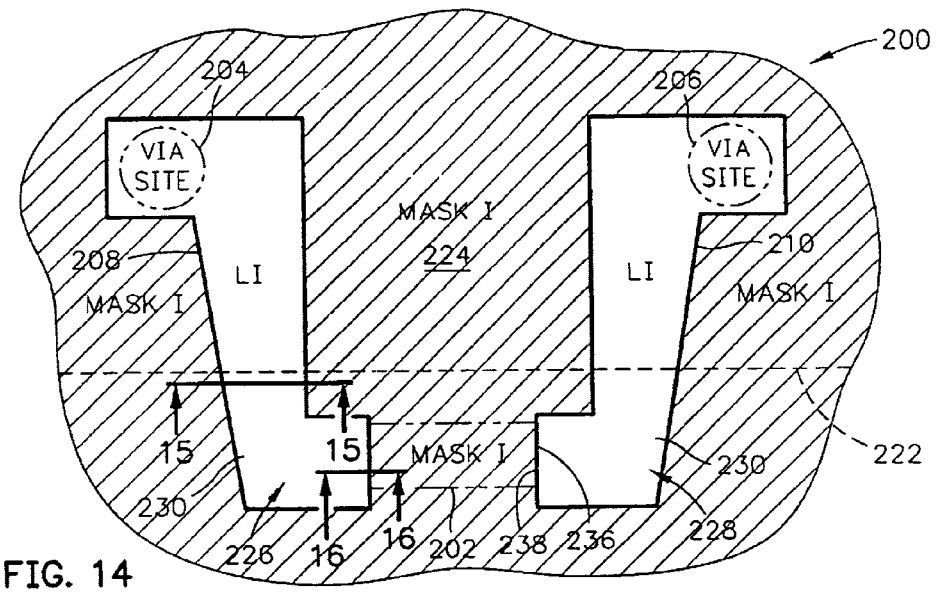
FIG. 14 is a plan view of a wafer wherein a mask is employed for defining the track width of the MR sensor and for depositing hard bias and first lead layer films of first and second lead layers of a previous MR read head.
Figure 15:
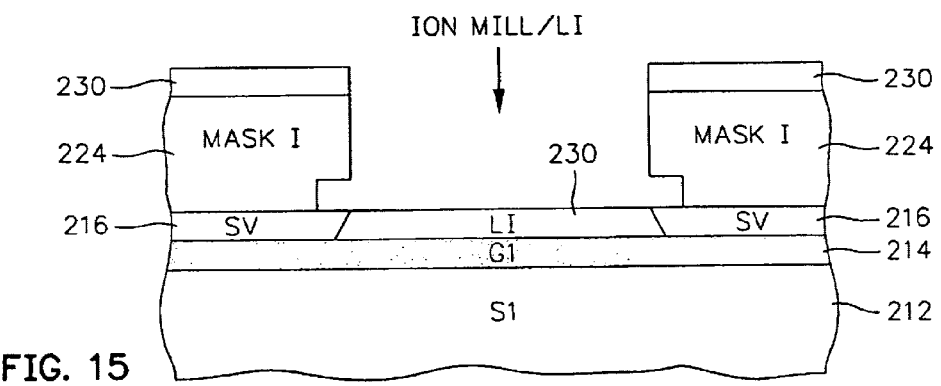
FIG. 15 is a view taken along plane 15—15 of FIG. 14.
Figure 16:
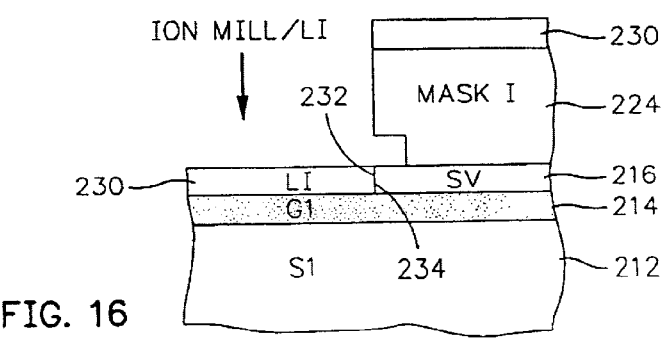
FIG. 16 is a cross-sectional view taken along plane 16—16 of FIG. 14.

In FIG. 14 a liftoff mask (Mask I) 224 is employed for covering the entire wafer portion except openings 226 and 228 at the first and second lead layer sites. As shown in FIGS. 15 and 16, the SV material layer 216 within the front lead layer sites 226 and 228 is milled away and hard bias and first lead layer films (shown as one film 230) are deposited on the first gap layer 214. It should be noted that the film 230 is formed as a full film deposition in which a portion of the film 230 is deposited on top of the mask 224. As stated hereinabove, the mask 224 is a bilayer photoresist mask (shown as one layer) with the bottom layer recessed from the top layer so that a dissolvent can dissolve the bottom. This allows the mask 224 to be removed from the wafer along with the film 230, which is done in a subsequent step. It should be noted in FIGS. 14 and 16 that the SV sensor material 216 at the SV sensor site 202 has been formed with a side edge 232 which directly abuts an end 234 of the film 230 at the first lead layer site to form a contiguous junction therebetween. An opposite side edge 236 of the SV sensor also forms a contiguous junction with an end 238 of the film 230 at the second lead layer site 228.

Figure 17:
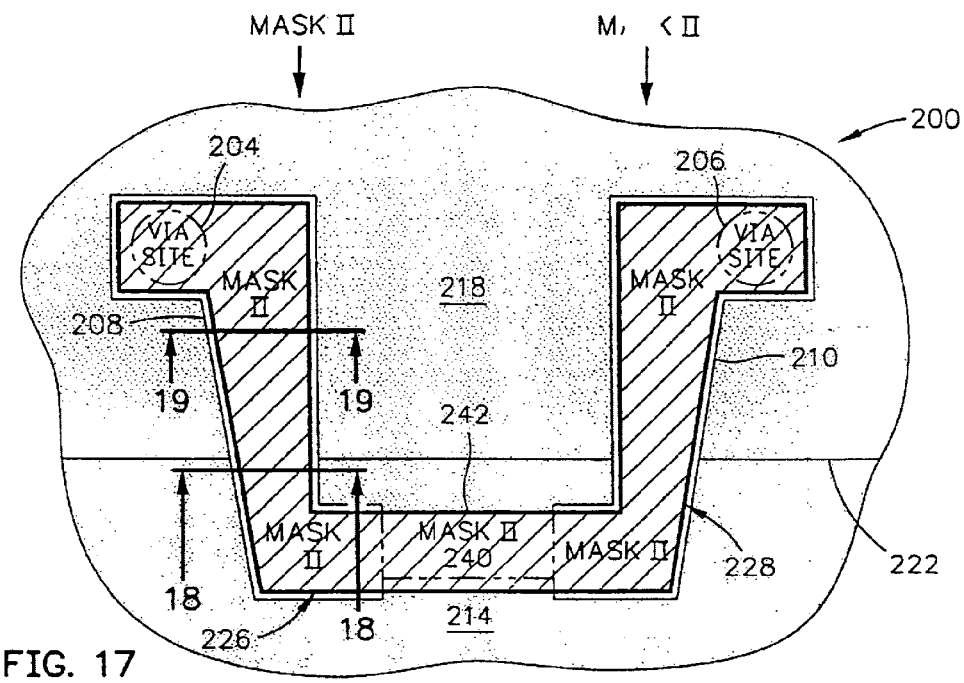
FIG. 17 is a plan view of a wafer wherein a mask is employed for defining the height of the previous MR sensor.
Figure 18:
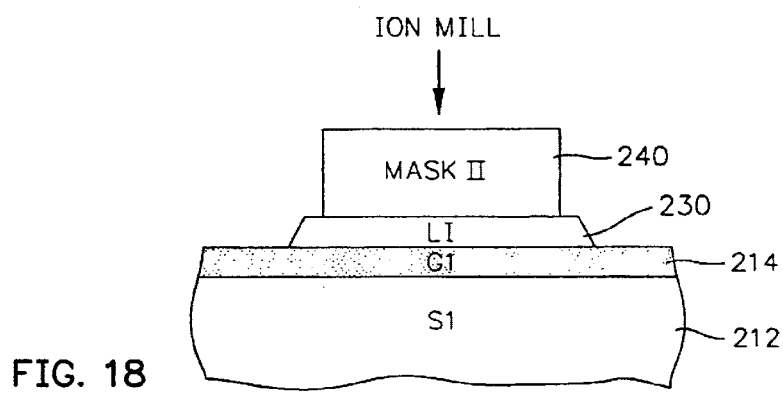
FIG. 18 is a cross-sectional view taken along plane 18—18 of FIG. 17.
Figure 19:
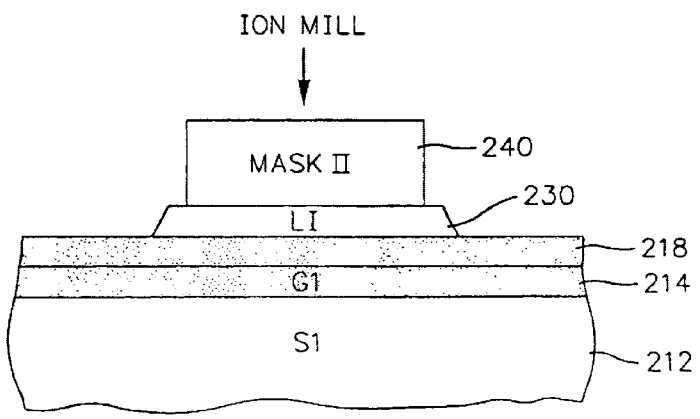
FIG. 19 is a cross-sectional view taken along plane 19—19 of FIG. 17.

In FIGS. 17, 18 and 19, the mask 224 in FIG. 19 has been removed and a second mask (Mask I) 240 has been formed covering only the SV sensor site 202 and slightly smaller portions of 226 and 228 of the first and second lead layer sites. As shown in FIGS. 18 and 19, the remainder of the SV material 216 is ion milled away so as to define the height of the MR sensor, which is shown at 242.

Figure 20:
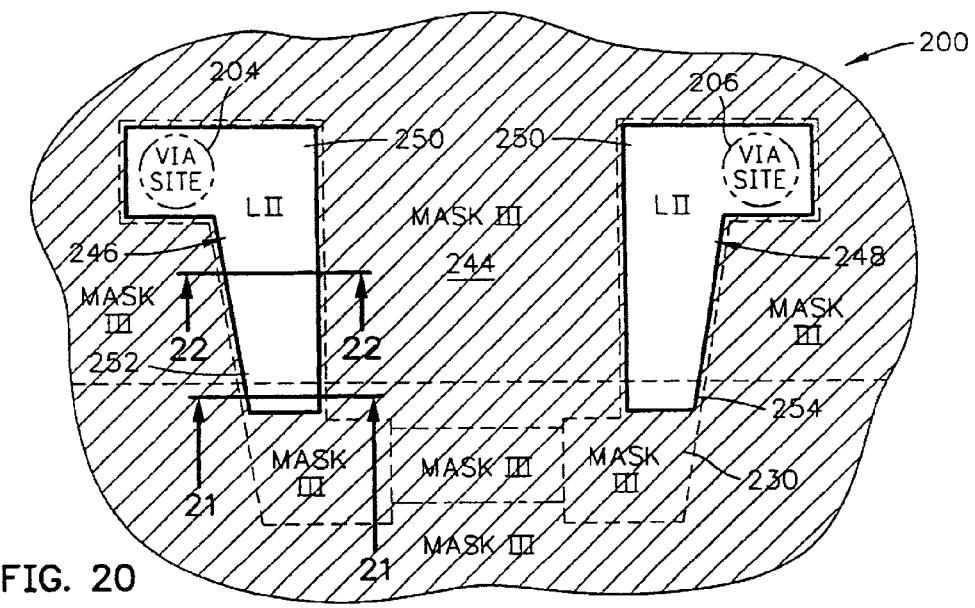
FIG. 20 is a plan view of a mask employed in a previous process for depositing a second lead layer film of each lead layer.
Figure 21:
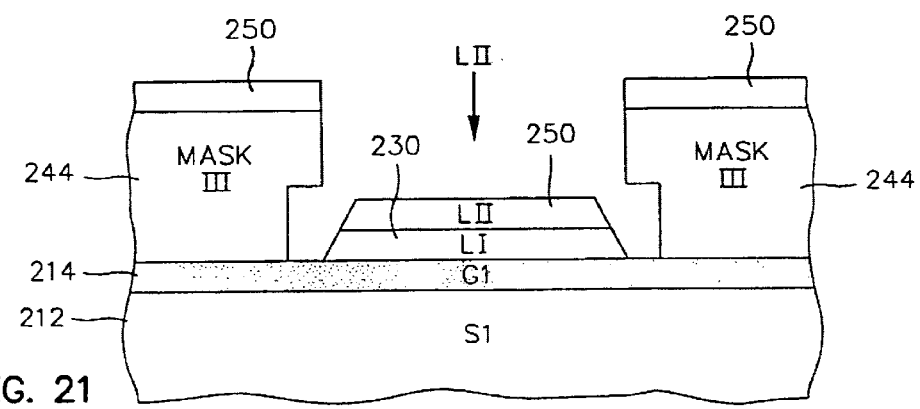
FIG. 21 is a cross-sectional view taken along plane 21—21 of FIG. 20.
Figure 22:
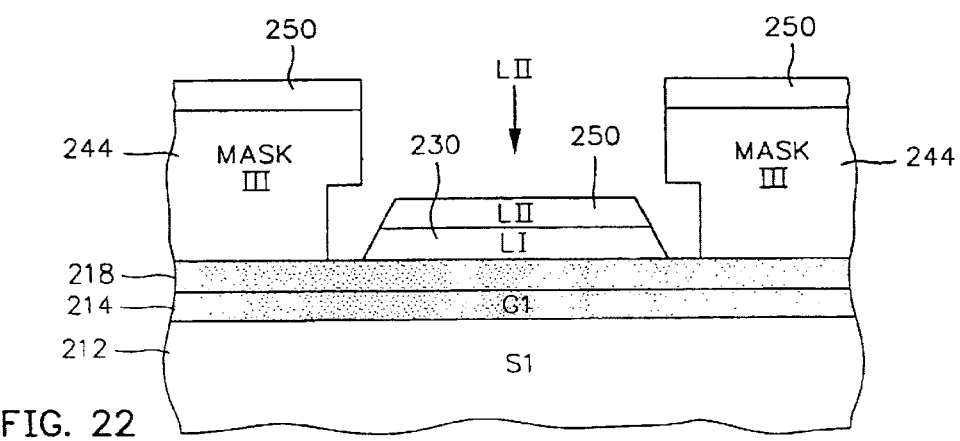
FIG. 22 is a view taken along plane 22—22 of FIG. 20.
Figure 23:
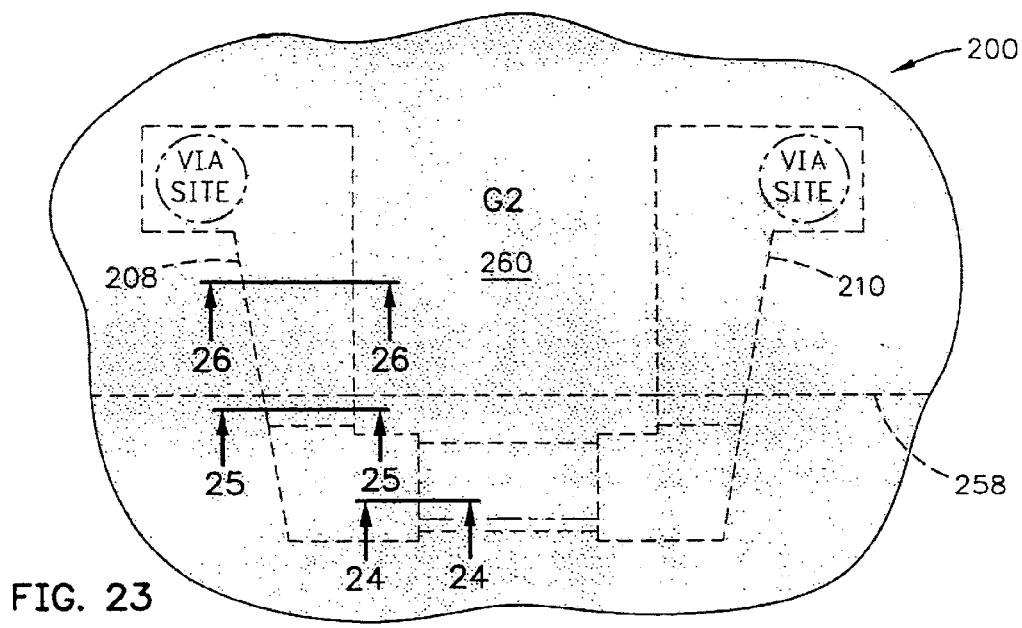
FIG. 23 is a plan view of the MR read head made by the previous process.
Figure 24:
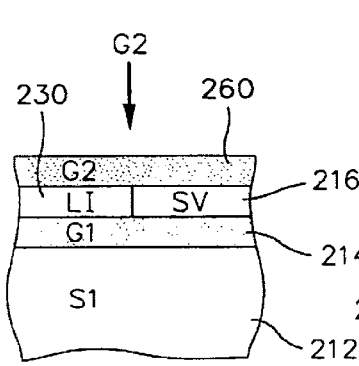
FIG. 24 is a cross-sectional view taken along plane 24—24 of FIG. 23.
Figure 25:
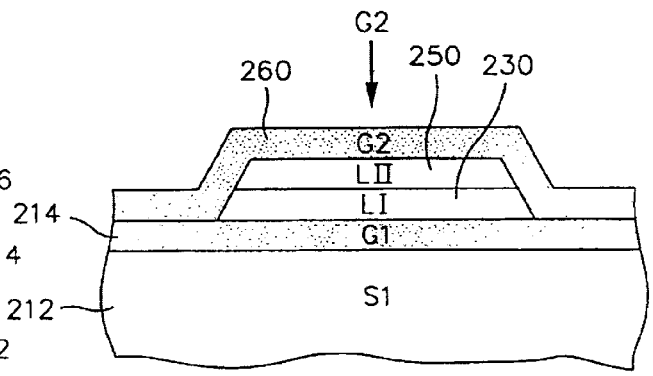
FIG. 25 is a cross-sectional view taken along plane 25—25 of FIG. 23.
Figure 26:
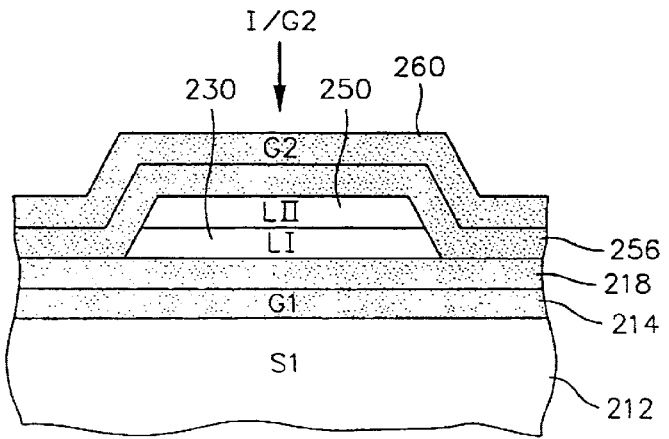
FIG. 26 is a cross-sectional view taken along plane 26—26 of FIG. 23.

In FIGS. 20, 21 and 22, the second mask 240 of FIG. 17 has been removed and a third mask (Mask III) 244 has been formed over the entire wafer portion 200, except rear portions 246 and 248 of the first and second lead layer sites. A second lead layer film 250 is deposited in the openings 246 and 248 so as to overlap and make connection with the underlying first lead layer films so that the lead layer films extend to the via sites 204 and 206. In FIG. 26, a second insulation layer 256 is formed in the rear portion of the head outside of the SV sensor frame, a front boundary thereof being shown at 258 in FIG. 23. A fourth mask (not shown) is employed for forming the second insulation layer 256. After removing the fourth mask a full film of a second insulative gap layer (G2) 260 is formed, as shown in FIGS. 23–26.

It should be noted that five separate masking steps are required to form the SV sensor 216, the first and second lead layer films 230 and 250 and the first and second insulation layers 218 and 256. Each masking step requires the wafer to be removed from the deposition chamber, thereby breaking vacuum and allowing the metallic layers 230 and 250 already deposited to become oxidized. This reduces adherence between the metal layers 230 and 250 and the insulation layers 214, 218 and 256 shown in FIGS. 24–26. While the sensor has been described as a spin valve (SV) sensor it could optionally be a magnetoresistive (MR) sensor.

Present Method of Making

FIGS. 27–40 illustrate the present method of making the read sensor and lead structure shown in FIG. 10. This method employs only two masks thereby eliminating a third mask employed in the method described in FIGS. 11–26. The third mask is eliminated by employing first, second and third capping layers which are deposited during various stages of the construction of the read sensor and the lead structure and which protects desired components of the structures during milling steps which will be explained in detail hereinbelow. The perimeters of the masks will be shown by heavy lines and areas covered will be shown by light cross hatchings.

Figure 27:
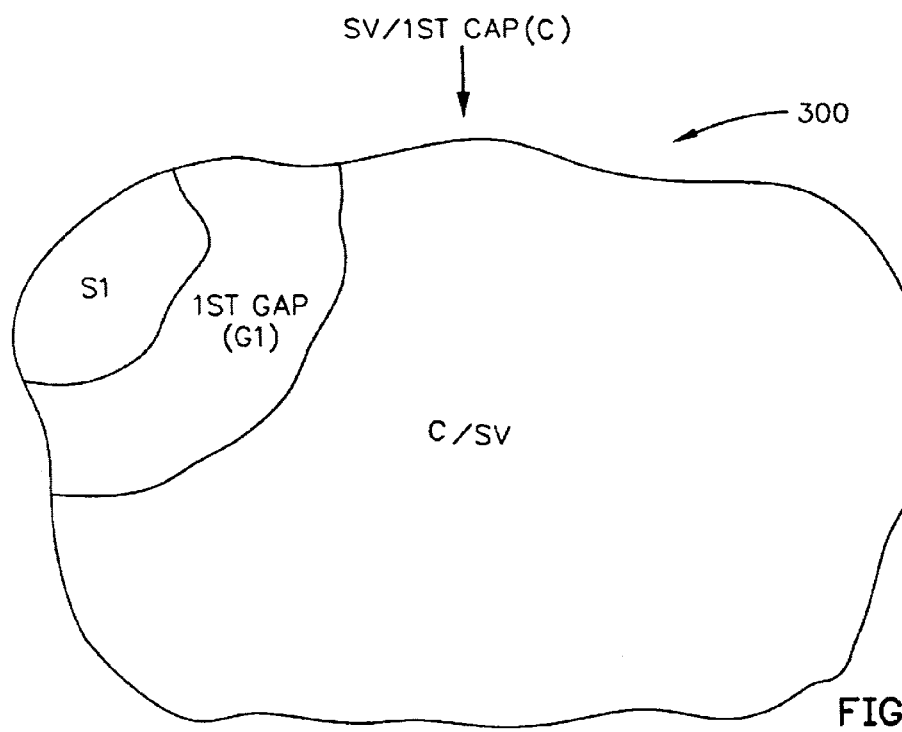
FIG. 27 is a plan view of a portion of a wafer at a read head site where read sensor material (SV) and a first capping layer have been deposited on top of a first gap layer and a first shield layer.

FIG. 27 illustrates a wafer portion 300 where a read sensor and first and second leads are to be constructed. After depositing a first shield layer (S1) and a first gap layer (G1) a spin valve (SV) material layer and a first capping layer (C) are formed on the wafer by any suitable means such as sputter deposition. The first capping layer (C) will be employed during subsequent steps to protect the spin valve sensor. The spin valve material includes multiple films (not shown), namely: a pinning layer, such as iron manganese (FeMn), a pinned layer, such as Permalloy (nickel iron) (NiFe), a spacer layer, such as copper (Cu), and a free layer, such as permalloy (NiFe) and a top protective layer such as tantalum (Ta).

Figure 28:
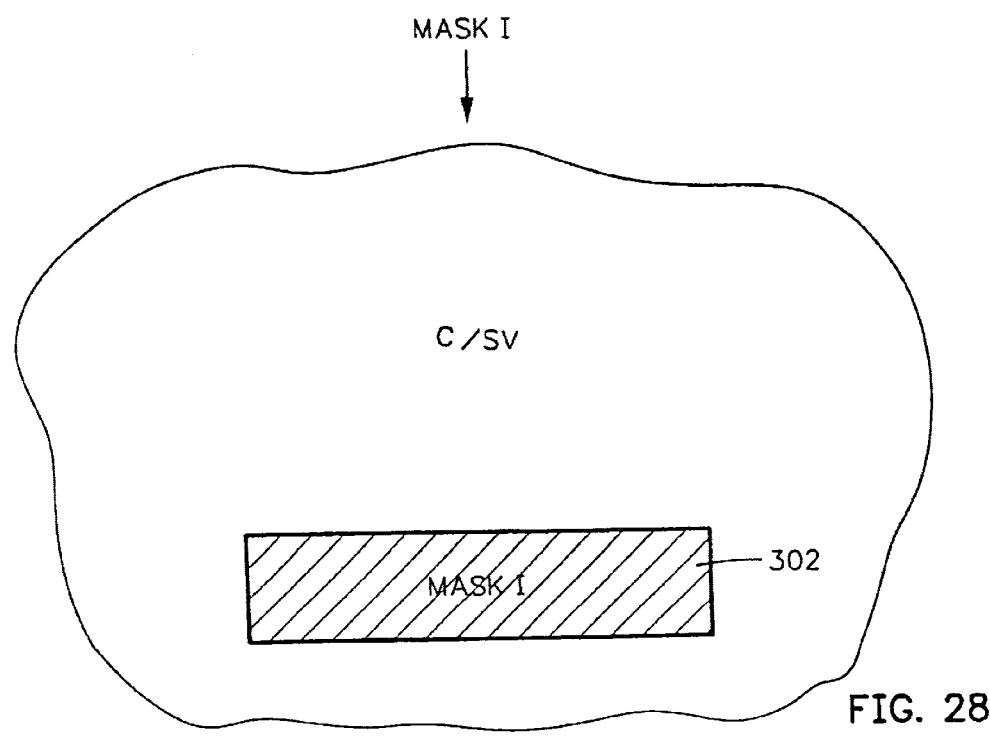
FIG. 28 is the same as FIG. 27 except a first mask has been formed over a read sensor site.
Figure 29:
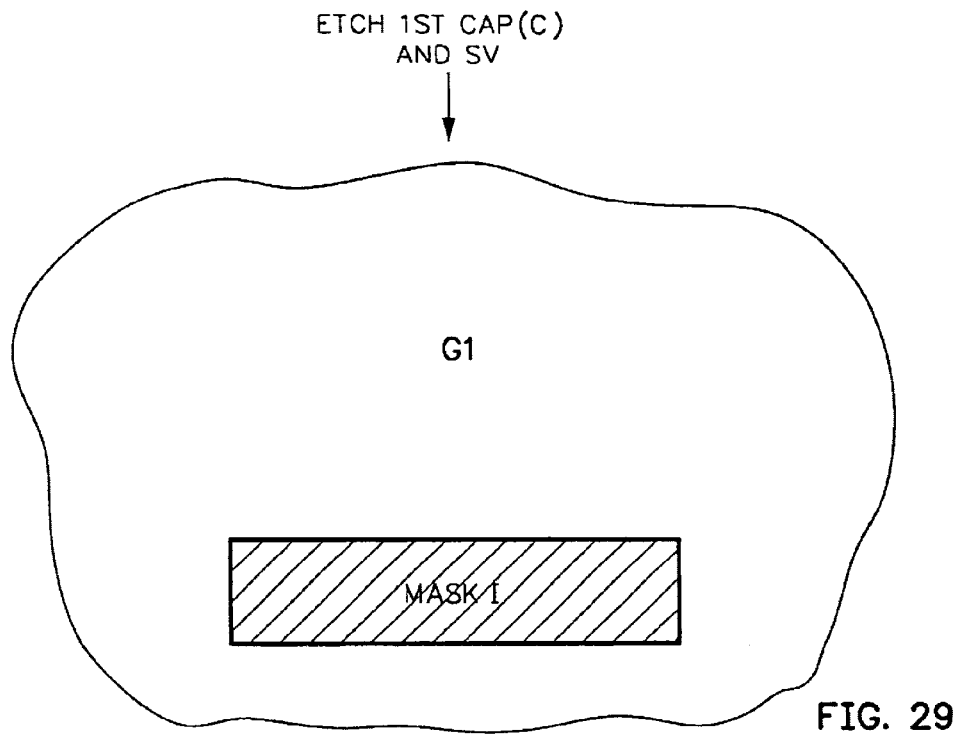
FIG. 29 is the same as FIG. 28 except the first capping layer (C) and the read sensor (SV) layer exposed by the first mask have been etched away.
Figure 30:
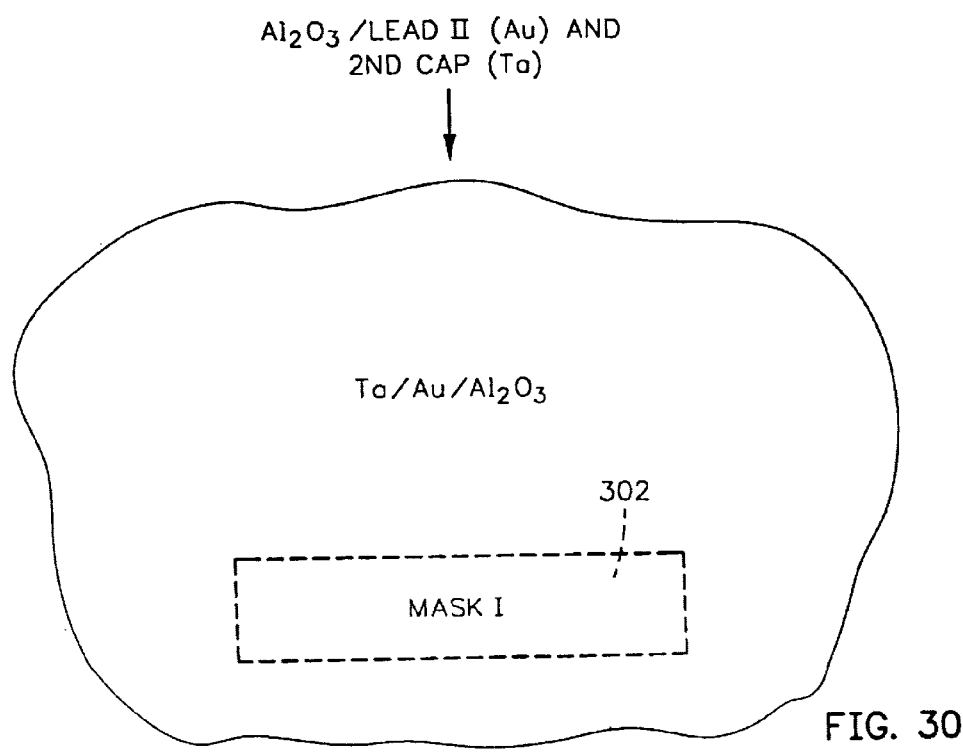
FIG. 30 is the same as FIG. 29 except an alumina layer ($Al_2O_3$), second lead layer (Au) and a second capping layer (Ta) have been deposited.
Figure 31:
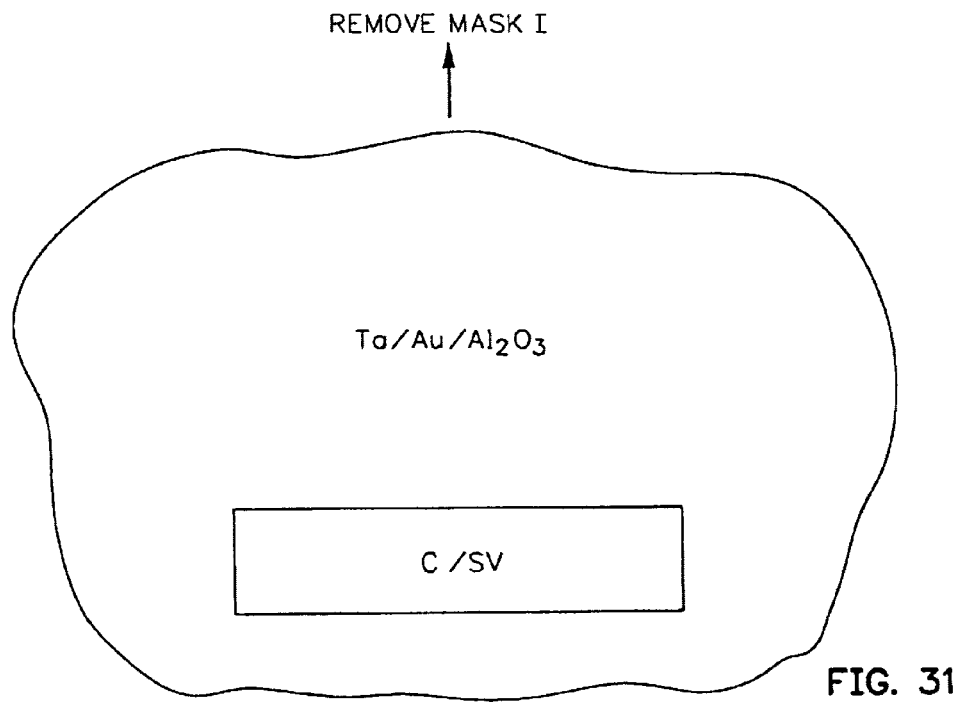
FIG. 31 is the same as FIG. 30 except the first mask has been removed leaving read sensor material (SV) capped by the first capping layer (C) at a read sensor site.

In FIG. 28 a first photoresist mask (Mask I) 302 has been formed which covers a read sensor site, as well as extensions on both sides thereof. In FIG. 29 milling, such as ion milling, has been employed to remove the first capping material (C) and the spin valve material (SV) about the first mask 302 so that the first gap layer (G1) is exposed. In FIG. 30 an alumina (Al$_2$O$_3$) layer, a low resistance lead layer material, such as gold (Au), and a second capping layer such as tantalum (Ta) has been deposited on the wafer by any suitable means such as sputter deposition. In FIG. 31, the first mask has been removed exposing the spin valve (SV) material portion and the first capping layer (C).

Figure 32:
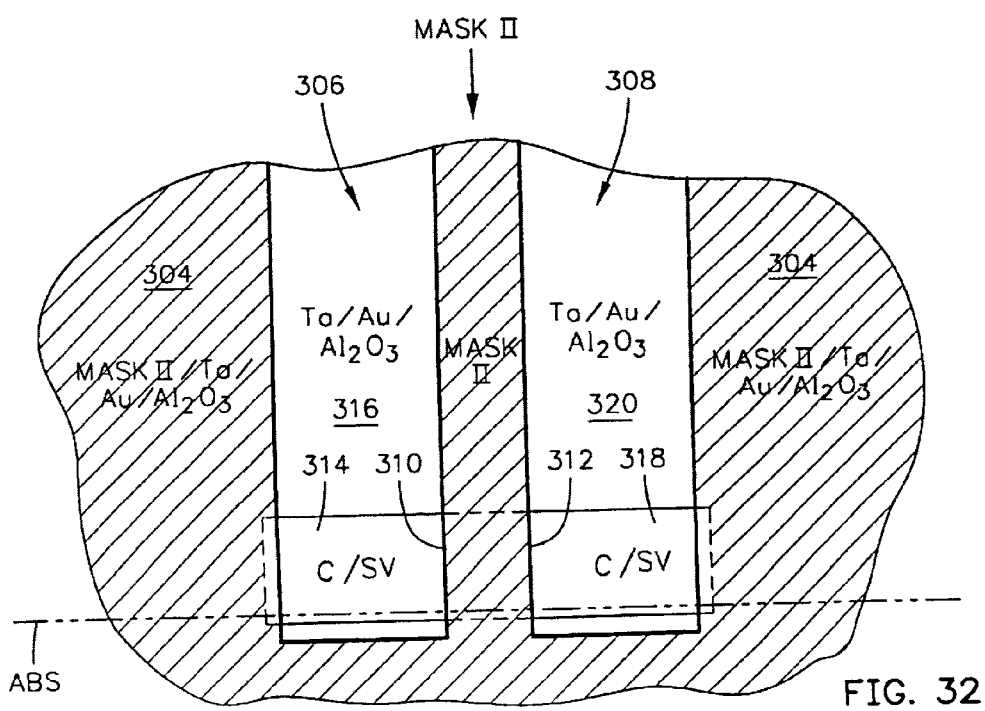
FIG. 32 is the same as FIG. 31 except a second mask has been formed with spaced apart openings defining the track width of the read sensor, as well as locations for first and second leads.

In FIG. 32 a second mask (Mask II) 304 has been formed with first and second openings 306 and 308. The openings 306 and 308 are elongated and expend perpendicular to an ABS site of the partially completed read head. The openings 306 and 308 have side edge portions 310 and 312 which will define a track width of the read sensor in subsequent steps. The first opening 306 exposes a high resistance lead material region 314 where a spin valve layer (SV) and a first capping layer (C) are located and a low resistance lead layer site 316 where an alumina ($Al_2O_3$) layer, a low resistance lead layer (Au) and the second capping layer (Ta) are located. The second opening 308 has the same arrangement in a high resistance lead layer site 318 and a low resistance lead layer site 320. The alumina ($Al_2O_3$) layers in the low resistance lead layer sites 316 and 320 are optional, but preferred for the purpose of insulating the partially completed low resistance lead layer portions from the first gap (G1).

Figure 33:
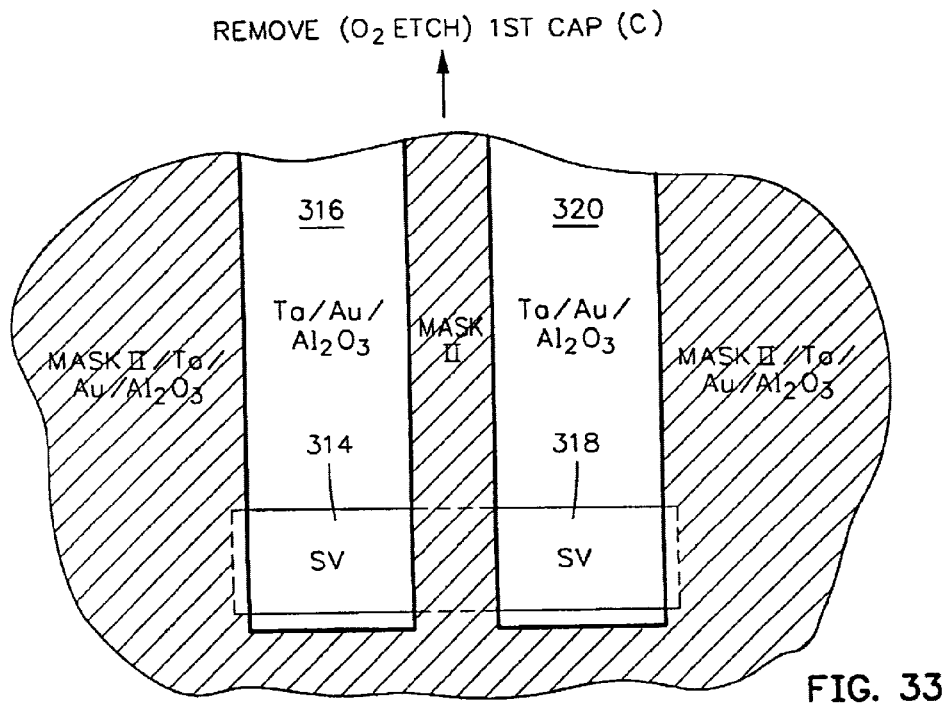
FIG. 33 is the same as FIG. 32 except the first capping layer (C) has been etched.
Figure 34:
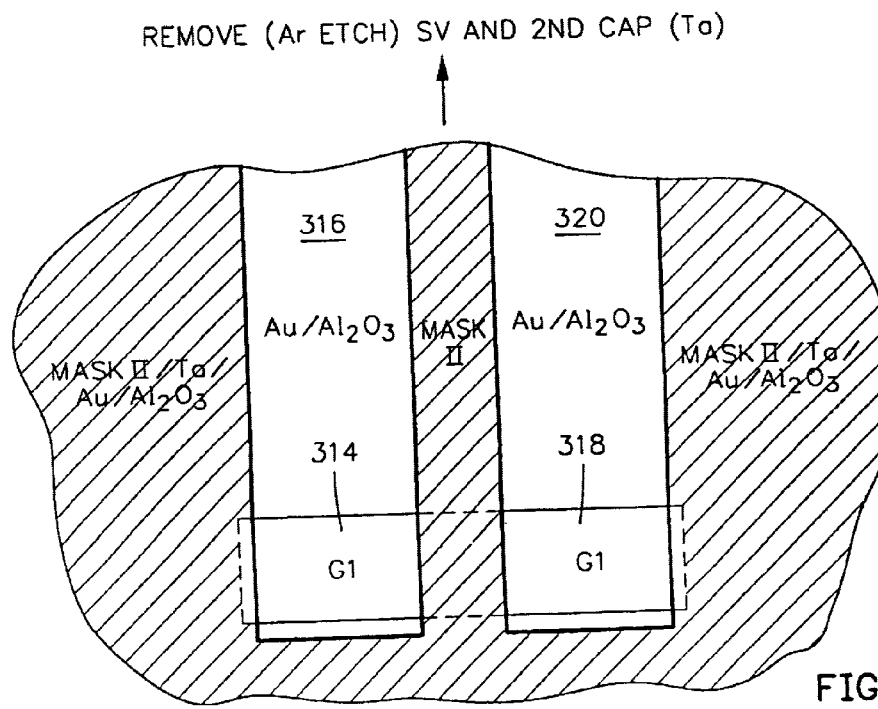
FIG. 34 is the same as FIG. 33 except the read sensor material (SV) and second capping layer (Ta) have been removed at the first and second lead sites.

In FIG. 33 oxygen reactive ion etching (RIE) or ion milling is employed for removing the first capping layer (C) in the high resistance lead layer sites 314 and 318. In FIG. 34 spin valve sensor material (SV) is removed from the high resistance lead layer sites 314 and 318 and the second capping layer (Ta) is removed from the low resistance lead layer sites 316 and 320 by milling such as an (Ar) etch. This leaves the first gap layer (G1) exposed in the high resistance lead layer sites 314 and 318 and the low resistance lead layer material (Au) exposed in the low resistance lead layer sites 316 and 320.

Figure 35:
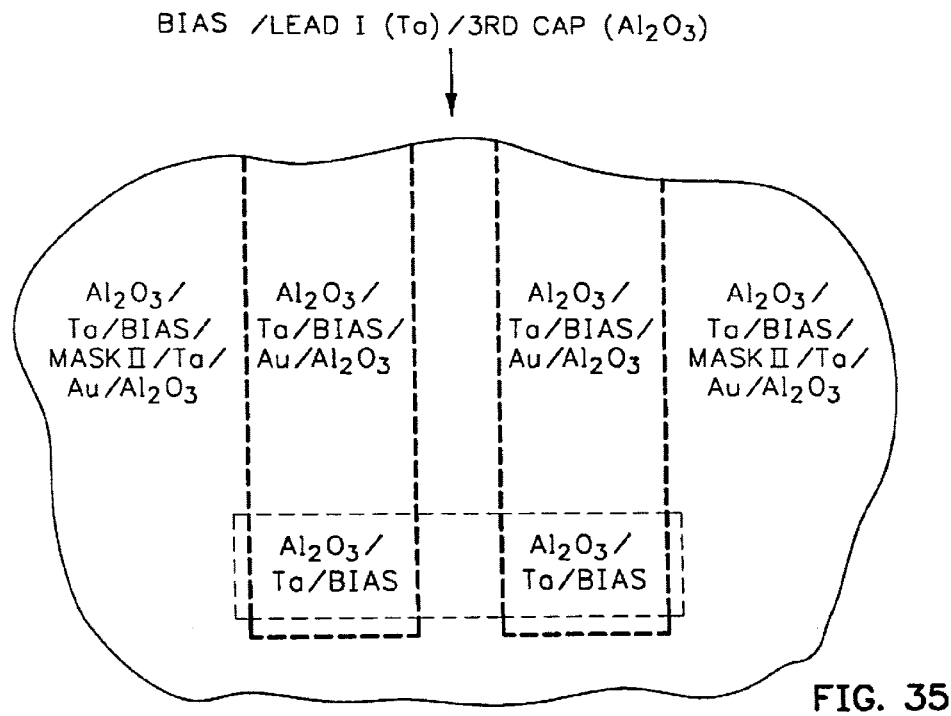
FIG. 35 is the same as FIG. 34 except a bias layer, a first lead material layer (Ta) and a third capping layer ($Al_2O_3$) have been deposited.
Figure 36:
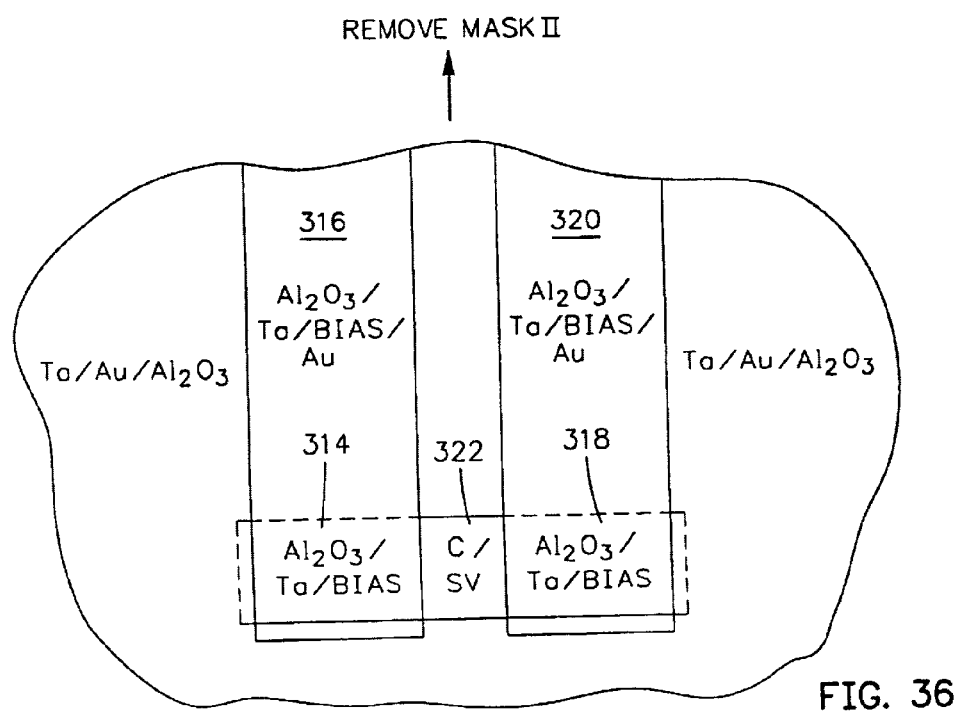
FIG. 36 is the same as FIG. 35 except the second mask has been removed.

In FIG. 35 a hard bias material layer, a high resistance material layer (Ta) and a third capping layer ($Al_2O_3$) is formed on the wafer by any suitable means such as sputter deposition. In FIG. 36 the second mask is removed leaving a partially formed spin valve (SV) sensor and a first capping layer (C) at a spin valve site 322, a hard bias layer, a second capping layer (Ta) and a third capping layer ($Al_2O_3$) in the first and second high resistance lead layer sites 314 and 318, a low resistance lead layer (Au), a hard bias layer, a second capping layer (Ta) and a third capping layer ($Al_2O_3$) in the low resistance lead layer sites 316 and 320 and an alumina layer ($Al_2O_3$), a low resistance material layer (Au) layer and a second capping layer (Ta) layer in field regions about the read sensor and lead structure sites.

Figure 37:
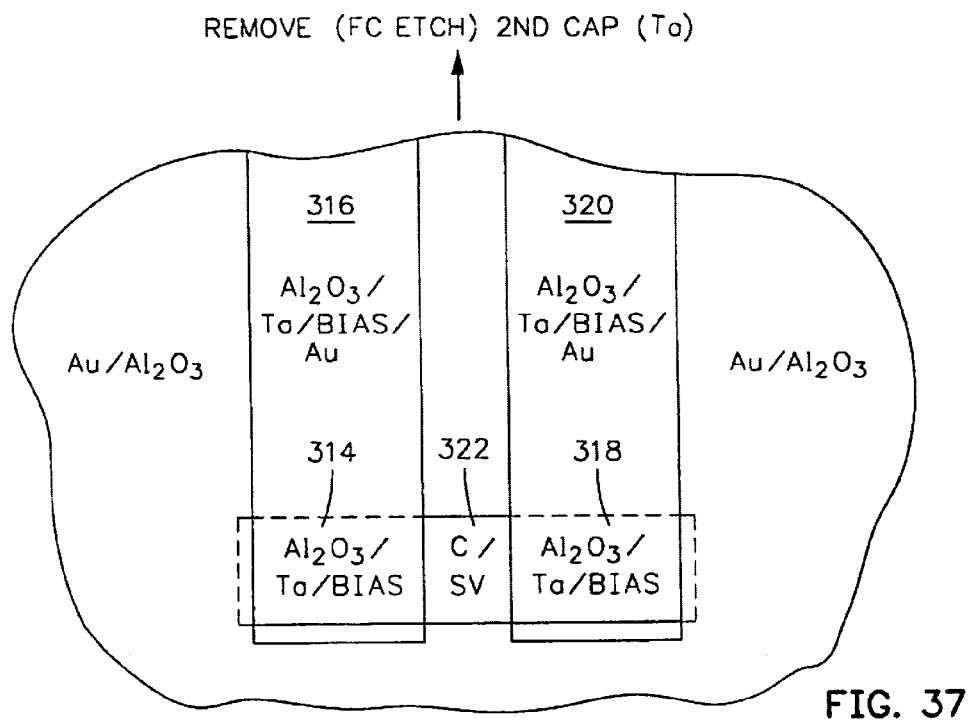
FIG. 37 is the same as FIG. 36 except the second capping layer (Ta) has been removed from field regions about the second mask.
Figure 38:
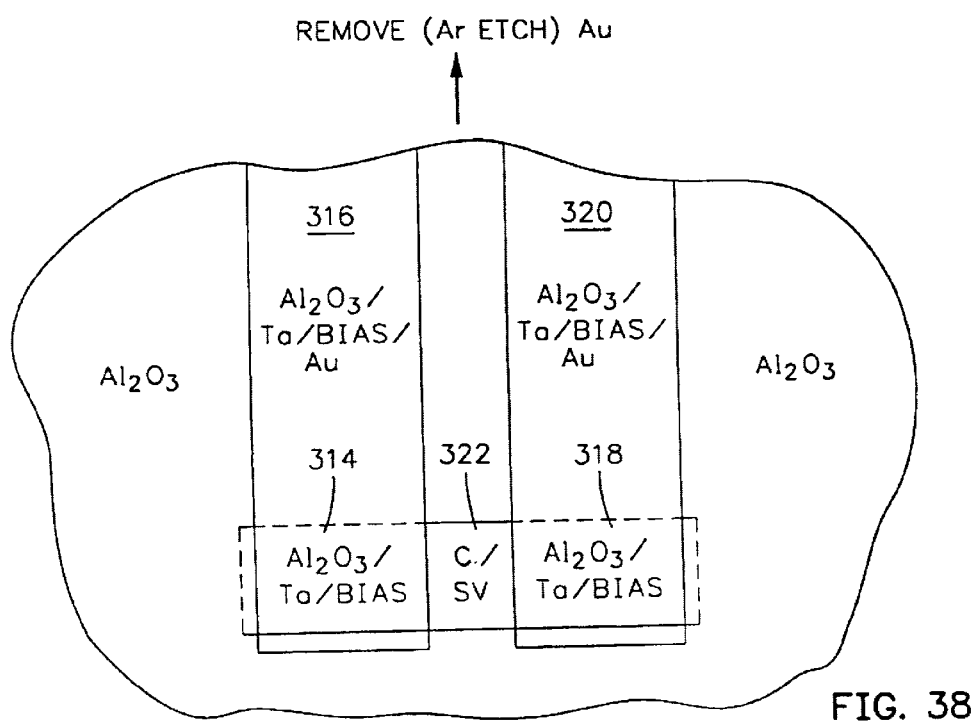
FIG. 38 is the same as FIG. 37 except first lead layer material (Au) has been removed in the field regions about the second mask.

In FIG. 37 a fluorocarbon gas reactive ion etching (RIE) or milling or argon (Ar) ion milling is employed for removing the second capping layer (Ta) in the field regions about the read sensor and first and second lead structure sites. In FIG. 38 milling, such as an argon (Ar) etch is employed for removing low resistance lead layer material (Au) in the field regions about the read sensor and first and second lead structure sites. This leaves only ($Al_2O_3$) in the field regions with the first and second lead layers protected by the third capping layer ($Al_2O_3$) and the read sensor (SV) protected by the first capping layer (C).

Figure 39:
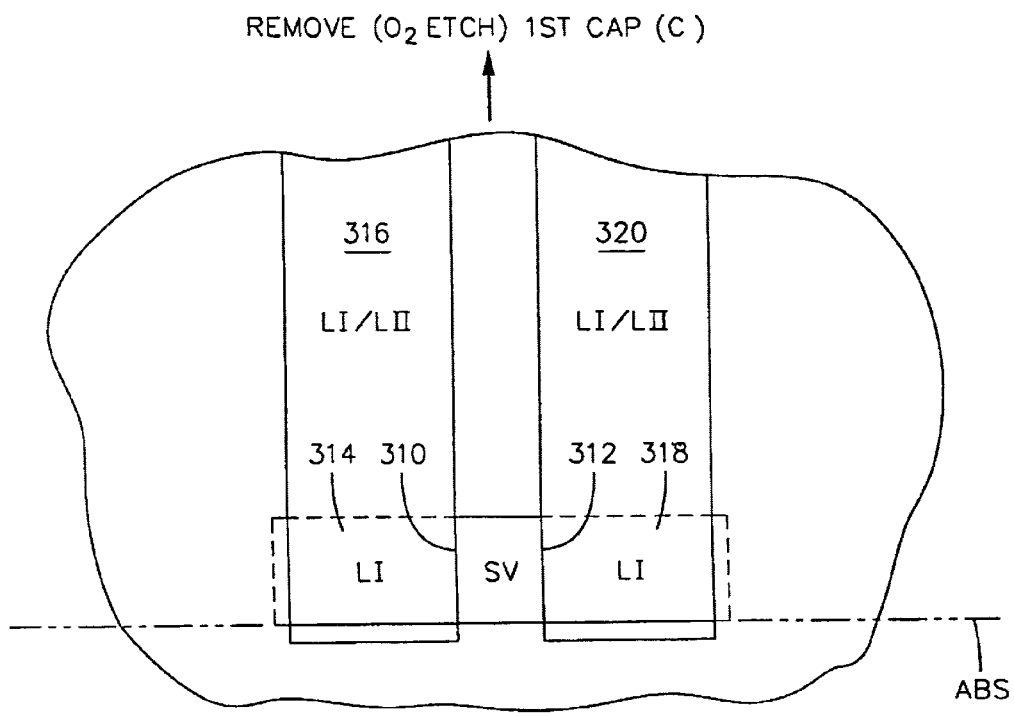
FIG. 39 is the same as FIG. 38 except the first capping layer (C) has been removed from the read sensor (SV)
Figure 40:
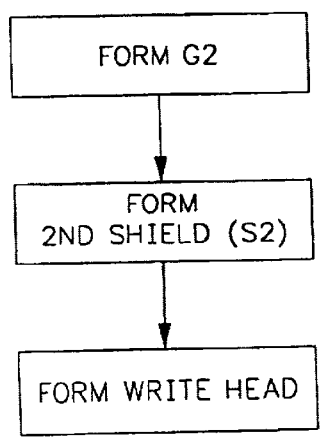
FIG. 40 is a block diagram showing steps for the completion of the magnetic head.

In FIG. 39 the first capping layer (C) is removed by oxygen RIE, such as an oxygen ($O_2$) etch. As shown in FIG. 40, the read head is then completed by forming the second gap layer (G2) on the wafer followed by forming the second shield layer (S2). Thereafter, the write head may be formed completing the merged head described hereinabove. It should be noted that the high resistance leads (LI) extend from the ABS and overlap the low resistance leads (LII). The high resistance leads LI make contiguous junctions with the side edges 310 and 312 of the spin valve (SV) sensor. With this construction, the resistance of the high resistance lead layers LI is minimized.

While FIGS. 27–39 set forth preferred materials and etching, it should be understood that other materials and milling may be substituted. The first, second and third capping layers may be selected from the group carbon (C), alumina ($Al_2O_3$), silicon oxide ($SiO_2$), Ta and tungsten (W) and the etching may be ion milling or RIE based on the group oxygen ($O_2$), argon (Ar), fluorocarbons (FC), etching and chlorine containing gases. Suitable materials for the first, second and third caps, the read sensor, the high resistance lead and the low resistance lead as well as removal of these various materials by ion milling or RIE based upon various chemicals are set forth in the following chart. The milling (Ar miling) rate of various materials in Å/min are as follows: w=340, Ni=530, Mn=880, Ta=420, c=110, $Al_2O_3$=100, Au=1080 and Cu=880.

|  | 1st Cap | 2nd Cap | 3rd Cap | Sensor | Lead(L.R.) |
| --- | --- | --- | --- | --- | --- |
| Material | C | Ta or W | $Al_2O_3$ | NiFe | Au or Cu |
| Removal | $O_2$ | FC |  | Ar | Ar |
| Material | $SiO_2$ | $Al_2O_3$ | $SiO_2$ | NiFe | Cu |
| Removal | FC | $BCl_3Cl_2$ |  | Ar | $BCl_3/Cl_2$ |
| Material | $Al_2O_3$ | $SiO_2$ | $Al_2O_3$ | NiFe | Au or Cu |
| Removal | $BCl_3Cl_2$ | FC |  | Ar | IM |

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of making a merged magnetic head that has an air bearing surface (ABS) comprising:

making a read head including:
forming a first ferromagnetic shield layer;
forming a first gap layer on the first ferromagnetic shield layer;
forming a sensor material layer on the first gap layer;
forming a first cap layer on the sensor material layer;
selecting across the layers a sensor region and first and second spaced apart lead regions wherein each of the first and second lead regions have first and second high resistance lead regions that traverse the sensor region so as to leave an active sensor region between the first and second high resistance lead regions and have first and second low resistance lead regions that extend from the first and second high resistance lead regions respectively away from the ABS;
removing a first portion of the first cap layer and the sensor material layer in all regions except the sensor region so that a second portion of the first cap layer remains covering the sensor region;
forming a low resistance material layer in all regions except the sensor region and forming a second cap layer on the low resistance material layer in all regions except the sensor region;
removing first and second portions of the second portion of the first cap layer in first and second portions of the sensor region leaving an active portion of the sensor region covered by a third portion of the second portion of the first cap layer;
simultaneously removing sensor material layer portions in the first and second portions of the sensor region and first and second portions of the second cap layer in the first and second low resistance lead regions;
forming first and second bias layers, first and second high resistance lead layers and first and second portions of a third cap layer in the first and second high resistance lead regions and the first and second low resistance lead regions;

removing second cap and low resistance material layer portions in all regions except the sensor region and the first and second high and low resistance lead regions;

forming a second gap layer in the active region of the sensor and on the first and second high resistance regions:

forming a second shield layer on the second gap layer;

making a write head including:

employing the second shield as a first pole piece layer and forming a second pole piece layer and a write gap layer with the first and second pole piece layers being separated by the write gap layer at the ABS and connected at a back gap that is recessed rearwardly in the head from the ABS; and forming an insulation stack between the first and second pole piece layers wherein the insulation stack has at least first and second insulation layers with at least one coil layer embedded therein.

2. A method as claimed in claim 1, wherein the low resistance material layer is Au.

3. A method as claimed in claim 1, including:

the cap layers being selected from the group C, Ta and $Al_2O_3$,; and the removing of the cap layer portions being by ion milling or etching based from the group of $O_2$, Ar fluorocarbon and chlorine based gases.

4. A method as claimed in claim 1, further including:

the first cap layer being C, the second cap layer being Ta and the third cap layer being $Al_2O_3$;

the removal of the first cap layer in all regions except the sensor region being by $O_2$ RIE, $O_2$ ion milling or Ar ion milling;

the removal of the sensor material layer in all regions except the sensor region being by Ar ion milling;

the removal of the first and second portions of the second portion of the first cap layer in the first and second portions of the sensor region without a removing of the second cap layer at the first and second low resistance lead regions being by an $O_2$ RIE or $O_2$ ion milling and the removal of the read sensor material layer in the first and second portions of the sensor region and the second cap layer in the first and second low resistance lead regions being by an Ar ion milling; and the removal of the second cap layer in all regions except the sensor region being by an Ar or fluorocarbon mill or etch and the removal of the low resistance lead material in all regions except the first and second low resistance regions being by an Ar ion milling.

5. A method as claimed in claim 1, including:

removing the third portion of the second cap layer from the active portion of the sensor region before forming said second gap layer.

6. A method as claimed in claim 5, including:

the cap layers being selected from the group C, Ta and $Al_2O_3$,; and the removing of the cap layer portions being by ion milling or etching based from the group of $O_2$, Ar fluorocarbon and chlorine based gases.

7. A method as claimed in claim 5, further including:

the first cap layer being C, the second cap layer being Ta and the third cap layer being $Al_2O_3$;

the removal of the first cap layer in all regions except the sensor region being by $O_2$ RIE, $O_2$ ion milling or Ar ion milling;

the removal of the sensor material layer in all regions except the sensor region being by Ar ion milling;

the removal of the first and second portions of the second portion of the first cap layer in the first and second portions of the sensor region without a removing of the second cap layer at the first and second low resistance lead regions being by an $O_2$ RIE or $O_2$ ion milling and the removal of the read sensor material layer in the first and second portions of the sensor region and the second cap layer in the first and second low resistance lead regions being by an Ar ion milling; and the removal of the second cap layer in all regions except the sensor region being by an Ar or fluorocarbon mill or etch and the removal of the low resistance lead material in all regions except the first and second low resistance regions being by an Ar ion milling.

8. A method as claimed in claim 7, wherein the low resistance material layer is Au.

* * * * *